(12) United States Patent
Waltman

(10) Patent No.: US 6,330,854 B1
(45) Date of Patent: Dec. 18, 2001

(54) REVERSIBLE CLAMPING MEMBER FOR A ROTISSERIE

(76) Inventor: John M. Waltman, 3336 Bald Mountain Rd., Auburn Hills, MI (US) 48326

( * ) Notice: Subject to any disclaimer, the term of this patent is extended or adjusted under 35 U.S.C. 154(b) by 0 days.

(21) Appl. No.: 09/705,242

(22) Filed: Nov. 2, 2000

(51) Int. Cl.[7] .............................. A47J 37/00; A47J 37/04
(52) U.S. Cl. ........................... 99/427; 99/419; 99/421 H; 99/426; 99/449; 99/450
(58) Field of Search .............................. 99/339, 340, 400, 99/401, 419–421 V, 426, 427, 444–450, 481, 482; 126/25 R, 9 R, 41 R; 24/300, 301, 715.3, 482, 16 PB, 20 R, 20 S; 403/41, 42, 220, DIG. 9

(56) References Cited

U.S. PATENT DOCUMENTS

| | | | |
|---|---|---|---|
| 3,147,690 | * 9/1964 | Smith | 99/427 X |
| 3,486,200 | * 12/1969 | Orenick | 24/16 PB |
| 3,875,620 | * 4/1975 | Wells et al. | 24/16 PB |
| 4,369,697 | * 1/1983 | Millington | 99/421 H |
| 4,421,017 | * 12/1983 | Ross | 99/421 H |
| 4,688,477 | 8/1987 | Waltman | 99/427.449 |
| 4,787,302 | 11/1988 | Waltman et al. | 99/427.449 |
| 4,982,657 | * 1/1991 | Ghenic | 99/427 X |
| 5,421,318 | * 6/1995 | Unruh et al. | 126/9 R |
| 5,485,780 | * 1/1996 | Koether et al. | 219/400 X |
| 5,562,022 | * 10/1996 | Schmid et al. | 99/427 X |
| 5,715,744 | * 2/1998 | Coutant | 99/421 R |
| 5,799,569 | * 9/1998 | Moreth | 99/446 X |
| 5,819,639 | * 10/1998 | Spell | 99/427 X |
| 5,887,513 | * 3/1999 | Fielding et al. | 99/421 H |

* cited by examiner

Primary Examiner—Timothy F. Simone
(74) Attorney, Agent, or Firm—Young & Basile, P.C.

(57) ABSTRACT

A reversible clamping member for use in a rotisserie grill having spaced end plates and a plurality of adjacent rods therebetween in a cradle formation connected at their ends to the plates. One pair of adjacent rods are spaced to define an opening for the passage of food into the interior of the cradle. The reversible clamping member has a pair of main rods intersecting each other and connected thereto at a center area of each main rod. Both main rods have slight bends in their center areas for closer positioning to the food located in the interior of the cradle. One of the main rods has a U-shaped member secured at each end, wherein one of the U-shaped member has legs perpendicularly extending from its center portion and the other U-shaped member has legs angularly extending from its center portion. A sleeve is removeably mounted at one end to one of the main rods, and the sleeve is removeably mounted at the other end to one of the adjacent rods of the grill.

11 Claims, 1 Drawing Sheet

REVERSIBLE CLAMPING MEMBER FOR A ROTISSERIE

FIELD OF THE INVENTION

The present invention relates to rotisseries and in particular to a reversible clamping device adapted to secure food on a rotisserie for rotation over a source of heat.

BACKGROUND OF THE INVENTION

In the prior art, food such as meat or vegetables to be grilled are generally placed on a spit which is rotatable to expose the food to the heat in order to ensure uniform cooking of the same. In cooking large meats, such as a pig, a roast or a large side of beef, the spit may not be capable of rotatably supporting the meat to be grilled because of its shape. In many situations the spit is provided with forks that are carried by the spit and which pierce the opposite ends of the meat. However, after a considerable amount of rotation on the spit, the forks sometimes break loose of the meat and the meat fails to rotate, causing uneven heating and cooking of the same.

In many applications the rotisseries include cradles, sometimes referred to as cages, in an attempt to facilitate the necessary support required for long periods of rotation of the meat. In many situations it is difficult to adequately secure, or anchor, the meat within the cradle, resulting in undesirable jostling of the meat during rotation of the rotisserie.

It would be desirable to provide a means for securing the meat within the cradle of the rotisserie so as to prevent movement of the meat which can result in portions of the meat breaking loose as it moves within the cradle. It would also be desirable to provide a means for securing the meat which is adaptable and allows for varying sizes of meat or vegetables, or adaptable for securing a large portion of the meat with one portion of the clamping member, and another smaller portion of the meat with another portion of the clamping member, wherein a single type clamping member is adaptable for both sizes of food products.

SUMMARY OF THE INVENTION

It is the intent of the present invention to address the aforementioned concerns. The present invention provides for a reversible clamping member for a rotisserie grill and especially for a rotisserie grill having a cradle formation made of a plurality of adjacent rods connected at each end by end plates. One pair of adjacent rods of the grill are spaced to define an opening for the passage of food. The reversible clamping member includes a first main rod and a second main rod wherein each main rod has a center portion and a pair of end portions. The first and second main portions intersect and are connected to each other at their respective center portions. A pair of U-shaped members for contacting and gripping the food in the grill are secured to the end portions of the first main rod. The clamping member further includes a means for connecting either one of the end portions of the second main rod to one of the adjacent rods of the grill.

In another aspect of the invention, at least one of the main rods is slightly bent at its center portion for positioning the U-shaped members closer to the food in the grill relative to the size and shape of the food.

In yet another aspect of the invention, the U-shaped member includes a center portion disposed between a pair of parallel leg portions, and the other U-shaped member has a center portion disposed between two angularly extending leg portions to provide further versatility in the size of food capable of being secured in the grill.

Further, in another aspect of the invention, the means for connecting one of the end portions to the grill includes a sleeve having one end configured for mounting over either end portion of the second main rod and another for securing to one of the adjacent rods.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
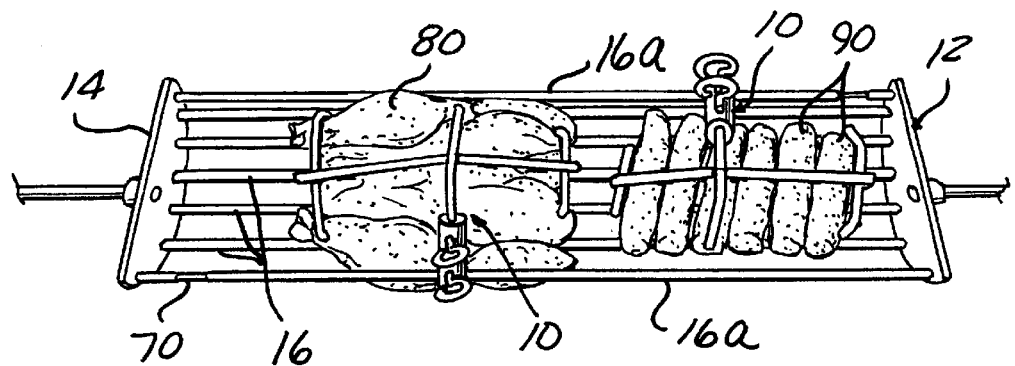
FIG. 1 is a perspective view of a cradle of a rotisserie having a clamping member according to the present invention.

Referring to the Figures, there is illustrated a clamping member 10 disposed on a rotisserie cradle 12. The rotisserie cradle 12 includes a pair of semicircular end plates 14 which are secured to each other at a fixed distance by means of a plurality of stainless steel rods 16 that are secured to the end plates by suitable means. The stainless steel rods 16 follow the curve of the semicircular end plates 14 to define the cradle shape. The two end stainless steel rods 16a define the entrance into the interior of the cradle grill 12.

Figure 2:
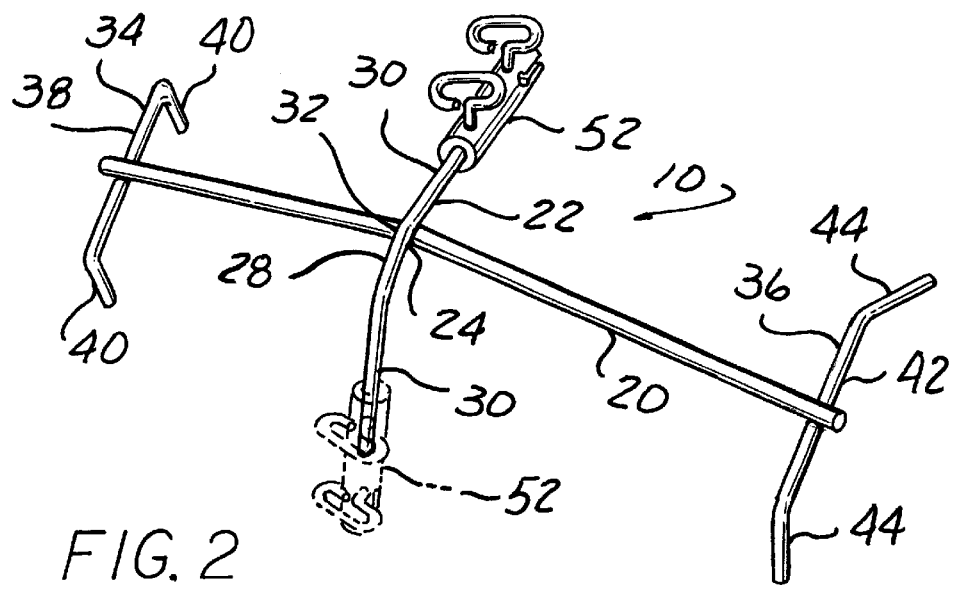
FIG. 2 is a perspective view of the clamping member of the present invention.

The clamping member 10 as best shown in FIG. 2 is configured for connection to one of the stainless steel rods 16, and particularly for connection to one of the end stainless steel rods 16a for securing a piece of food to be cooked within the cradle interior.

Referring now to FIG. 2, each clamping member 10 includes a first main rod 20 and a second main rod 22. The second main rod 22 intersects and is connected to the first main rod 20 in a perpendicular formation. The first main rod 20 is slightly bent to a V-formation, and the second main rod 22 intersects the first main rod 20 at the peak 24. As will be discussed hereinafter, one end of the second main rod 22 is connectable to the grill 12 while the other end of the second main rod 22 is directed into the food located in the grill 12.

In the preferred embodiment, the second main rod 22 also has a bend to form a modified V-formation having a center straightened portion 28 disposed between two angular end portions 30. The first main rod 20 is connected by conventional means such as welding to the second main rod 22 at one of the bending points 32 of the second main rod 22. In addition, the straightened portion 28 of the second main rod 22 is positioned offset from the center of the second main rod 22 so that each angular end portion 30 of the second main rod 22 can extend at different lengths and different angles into the meat or other food product.

In the preferred embodiment, the first main rod 20 further includes a U-shaped member 34, 36 secured at each end of the first main rod 20. The first U-shaped member 34 has a straight center portion 38 disposed between a pair of parallel leg portions 40. The second U-shaped member 36 also has a straight center portion 42, but is disposed between a pair of angularly extending leg portions 44. The U-shaped members 34, 36 are provided to grip into the food product in the grill. The different shapes of the U-shaped members 34, 36 allow for various sizes and shapes of the food product to be secured.

Means are provided for removably mounting the reversible clamping member 10 to one of the end stainless steel rods 16a. The removable mounting means 50 includes a cylindrical sleeve 52. One end of the cylindrical sleeve includes a cylindrical through aperture 54 sized for receiving one of the end portions 30 of the second main rod 22. The second main rod 22 of the clamping member 10 is secured to the sleeve 52 by means of a bolt 56 threadingly engaged through a threaded aperture 58 located through the sidewall of the cylindrical sleeve 52. Tightening bolt 56 causes the second main rod 22 to be fixedly anchored within aperture 54, thereby holding the reversible clamping member 10 in a desired angular and longitudinal position.

Figure 3:
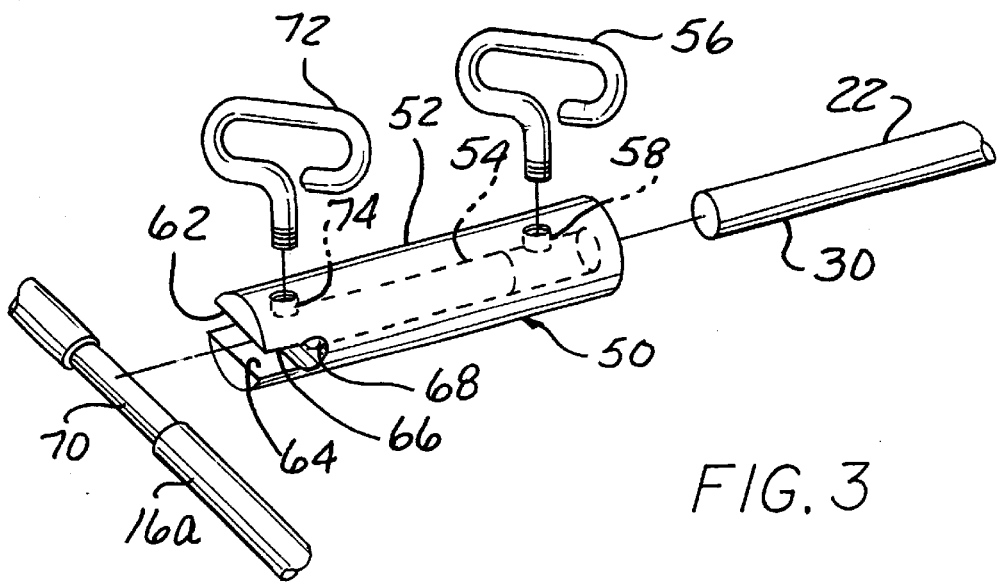
FIG. 3 is an exploded view of a portion of the clamping member for attachment to the grill.

Means are further provided for removably mounting the reversible clamping member 10 to one of the end stainless steel rods 16a of the grill. The second end of sleeve 52 comprises a slot 62 having a pair of opposing parallel faces 64 and 66, respectively, in communication with a perpendicular bore 68 such that the cylindrical sleeve 52 is selectively removable from the end stainless steel rod 16a by moving the cylindrical sleeve 52 to a notched portion 70 of the end stainless steel rod 16a. The notched portion 70 may have parallel, longitudinal notched faces smaller than the slot 62 in the cylindrical sleeve allowing the end of the stainless steel rod 16a to pass through slot 62 of the cylindrical sleeve 52. As an alternative and as shown in FIG. 3, the notched portion 70 may have a radial surface having a diameter smaller than the slot 62. The sleeve 52 is anchored to the end stainless steel rod 16a by means of another bolt 72 threadingly engaged through another threadable aperture 74 through the wall of the sleeve 52 at the second end in communication with bore 68. The tightening of bolt 72 causes the end stainless steel rod 16a to be fixedly anchored between the bolt 72 and the perpendicular bore 68 holding for the clamping member 10 in a desired angular and longitudinal position.

By selectively positioning the cylindrical sleeve 52 on one end 30 or the other of the second main rod 22, as shown in FIG. 2, the positioning of the second main rod 22 relative to the food product in the grill can be predetermined. For large portions of food, such as a chicken 80, as shown in FIG. 1, the sleeve 52 is preferably positioned on the end 30 of the second main rod 22 such that the second main rod 22 is raised to allow space for the large food item in the grill 12. In other instances, when the food item is small such as the sausages 90 shown in FIG. 1, it would be desirable to position the second main rod 22 such that the second main rod 22 extends lower into the cradle grill 12 to contact and secure the smaller food items. Further, the dissimilar U-shaped members 34, 36 positioned at the ends of the first main rod 20, allow smaller portions of the food item to be held by the first U-shaped member 34 having the parallel leg portions 40 and larger portions of the food item to be held by the second U-shaped member 36 with its angularly extending leg portions 44.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A reversible clamping member for a rotisserie grill having spaced end plates and a plurality of adjacent rods therebetween in a cradle formation and connected at their ends to the spaced end plates, wherein a one pair of adjacent rods of the grill are spaced to define an opening for the passage of food, the clamping member comprising:

a first main rod and a second main rod, each first and second main rod having a center portion and a pair of end portions, said first main center portion and second main center portion intersecting and connected to said second main center portions;

a pair of U-shaped members secured to the end portions of the first main rod; and means for connecting one of the end portions of the second main rod to one of the adjacent rods of the grill.

2. The reversible clamping member of claim 1 wherein at least one of the main rods is slightly bent at the respective center portion.

3. The reversible clamping member of claim 1 wherein the first main rod is longer than the second main rod.

4. The reversible clamping member of claim 3 wherein the first main rod and the second main rod are bent in their respective center portions.

5. The reversible clamping member of claim 1, wherein each U-shaped member has a center portion and a pair of leg portions.

6. The reversible clamping member of claim 5, wherein one of the U-shaped members has essentially parallel leg portions.

7. The reversible clamping member of clam 5, wherein one of the U-shaped members has leg portions angularly extending from the center portion.

8. The reversible clamping member of claim 1, wherein the means for connecting one of the end portions of the second main rod includes a sleeve having a first end configured for mounting over either end portion of the second main rod and having a second end engageable with one of the adjacent rods.

9. The reversible clamping member of claim 8, wherein the means for connecting one of the end portions further includes a first bolt threadingly receivable in a first bore of the sleeve and engageable with either end portion of the second main rod, and a second bolt threadingly receivable in a second bore of the sleeve and engageable with the one of the adjacent rods.

10. The reversible clamping member of claim 1, wherein the second main rod divides the first main rod into a first pair of dissimilar length portions.

11. The reversible clamping member of claim 10, wherein the first main rod divides the second main rod into a second pair of dissimilar length portions.

* * * * *